Patented May 15, 1951

2,553,288

UNITED STATES PATENT OFFICE 2,553,288

SOLVENT TREATMENT

Harland H. Young and Howard C. Black, Chicago, Ill., assignors to Swift & Company, Chicago, Ill., a corporation of Illinois No Drawing. Application December 7, 1944, Serial No. 567,126

16 Claims. (Cl. 260—410.7)

This invention relates to the fractionation of fatty esters and has to do more particularly with the separation of glycerides of higher fatty acids into fractions of varying degrees of saturation and melting point by solvent treatment. The invention involves the purification and fractionation of various esters of polyhydric alcohols, for example, glyceride oils including triglycerides and partial glycerides, such as mono- and diglycerides. The invention has particular application to the treatment of both animal and vegetable fats, for example, the destearinating of animal fats such as white and yellow grease to produce stearine and grease oil, the purification and separation of mono- and diglycerides from mixtures of mono-, di-, and triglycerides, and the separation of glycerides from the fatty esters of higher monohydric alcohols such as occur in sperm oil.

Naturally occurring glycerides are made up of components of varying degrees of saturation and melting point. In order to have maximum utility it is at times desirable to separate fractions of like degrees of saturation and melting point from the original mixture. The common method used in the past for accomplishing this separation has been the so-called seeding in which the melted fatty material is slowly chilled. The more saturated portions crystallize and are separated by a straining or pressing operation. Solvent fractionation has been proposed as a means for separating the more saturated from the less saturated fractions but experience has shown that as sharp a separation as desired is not obtained. A sharp separation can be obtained if the fatty material is dissolved in a solvent and chilled until the higher melting point constituents crystallize. The solid material is then filtered off and washed with fresh chilled solvent.

By dissolving the fatty material in a solvent, generally at an elevated temperature, and cooling the mixture gradually, a fraction precipitates which consists of the higher melting, more saturated constituents. If the cooling and separation are carried out properly the fraction which separates is quite uniform in degree of saturation and melting point and consists of products of quite similar chemical constitution and physical properties. After the solid precipitate has been removed, further cooling of the filtrate results in the separation of a further fraction which is somewhat less saturated and of slightly lower melting point than the original precipitate. The filtration and cooling steps may be continued to yield any number of fractions, each with different melting point and degree of saturation.

If the process is carried out carefully, quite sharp separation can generally be obtained. If further degree of separation is desired any of the fractions can be re-dissolved in a portion of the solvent or another solvent and re-chilled and filtered in a manner similar to the original chilling and filtering. By repetition of this process fractions of high degree of uniformity and purity can be produced.

Polyhydric alcohol partial esters, particularly fatty acid monoglycerides, are employed in many ways and for different purposes because of their surface-activity, compatibility with numerous materials, and other desirable physical and chemical properties. In recent years many methods have been described for the preparation and use of these polyhydric alcohol partial esters. In general, however, these procedures do not produce simple mixtures of monoglycerides but instead they usually form compositions containing in addition to the monoglycerides some diglycerides and triglycerides, as well as other organic and inorganic impurities. Among the methods disclosed in prior patents is that of Kapp, U. S. Patent No. 2,207,257, wherein a mixture of fatty acid mono-, di-, and triglycerides is extracted from soap of the corresponding fatty acids. The resulting product is, as stated hereinbefore, a mixture of materials, some of which are not desired.

It is an object of this invention to prepare purer and more uniform fractions of esters of polyhydric alcohols including polyhydric alcohol partial esters.

Another object of this invention is to separate mixtures of fatty acid glycerides into uniform fractions, each possessing different physical and chemical properties.

Another object of the invention is to provide an improved process for separating glyceride esters and esters of other polyhydric alcohols by fractional crystallization.

Another object of this invention is to produce relatively pure fractions of fatty acid partial esters having uniform unsaturation, solubility, stability, surface-activity and other desirable properties.

An additional object is to provide an economical process for solvent extracting fatty acid monoglycerides in order to purify said materials.

A further object of the invention is to provide improved solvents for separating fatty acid glycerides by solvent crystallization.

A further object of the invention is to produce relatively pure fractions of fatty acid partial glycerides having uniform unsaturation, solubility, stability, surface-activity, and other desirable properties.

An additional object is to provide an economical process for solvent extracting of fatty acid monoglycerides in order to purify said materials.

The present invention contemplates broadly the dissolving of the ester material in a suitable solvent, then reducing the temperature of the solution to separate fractions of esters and separating the fractions so separated. One method is to form a solution of a mixture of esters in a crystallization solvent having a differential solubility for the various components of the mixture, utilizing sufficiently high temperatures to completely dissolve the oil, chilling the solution to separate the desired fraction as crystals and then separating the crystals from the remaining solution by suitable means such as filtration or gravity separation. Generally, when a solution of the fatty material and a solvent is chilled or when an anti-solvent is added, the material which first precipitates is the higher melting, more saturated fraction. As the temperature is further reduced the less saturated, lower melting point fractions begin to precipitate. By controlling the amount of solvent and the temperature, any desired number of fractions may be separated.

The present invention may be used for separating various types of glyceride fats including triglyceride, diglyceride, monoglycerides or mixtures thereof. Also the invention can be applied to the separation of the fatty acid esters of other polyhydric alcohols such as ethylene glycol, propylene glycol, erythritol, diethylene glycol and the like. These may be either completely esterified esters or partial esters. It may also be applied to separation of the fatty esters of monohydric alcohols such as occur in the common waxes, for example, beeswax and spermaceti.

The broad principles of the present invention may be applied to any of the aforementioned materials although the specific details of the invention may have to be varied depending on the species of the material treated. In practicing the invention it is desirable to use conditions most favorable to the particular solvent being employed. Thus the temperature and the solvent ratio may have to be varied depending on the method of treatment. The temperature of operation will depend mainly on the type of solvent, the proportion of solvent, and the material under treatment. The solvents are ordinarily more selective at lower temperatures but the quantity of material dissolved is usually lower, hence it is a question of balancing the degree of separation against the quantity of solvent required. In general, it is necessary to use only sufficient temperatures to obtain solution of the oil in the solvent. Usually these temperatures will be within the range of about room temperature (about 70° F.) to about 200° F. The proportion of solvent to ester material under treatment will usually be within a range of about 1 part to 15 parts by volume of solvent to 1 part of oil. For simple single-stage crystallizations a proportion of about ½ to 5 parts of solvent to 1 part of ester material is satisfactory, and preferably about 1-3.

One aspect of the present invention comprises the purification and/or fractionation of partial esters of aliphatic polyhydroxy substances occurring in mixtures containing these materials by solvent extraction with a selective solvent. It has been found that when a polar solvent is contacted with mixtures containing partial esters of aliphatic polyhydroxy substances there is a greater tendency to dissolve the polyhydroxy substances having the lower number of ester substitutions than those more fully esterified, and the more unsaturated derivatives than the more saturated ones. By this means the applicants can extract concentrated monoglycerides from mixtures containing di- and triglycerides, and/or to separate monoglycerides into unsaturated and saturated fractions. The polar solvent is employed in such proportions and under such conditions that two phases are formed; one a solution of the aliphatic polyhydroxy substances having a larger number of free hydroxyl groups, and the other an insoluble or at least partially immiscible phase containing some impurities and more fully esterified polyhydroxy compounds. One method is to operate so that two liquid phases are formed; in other words, to employ liquid-liquid extraction.

When employing liquid-liquid extraction it is within the scope of this invention to employ continuous counter-current extraction (in a tower), multiple-stage counter-current extraction (mixing and settling), or one or more stages of batch extraction (mixing and settling). In any of these procedures one or more miscible polar solvents may be used to effect controlled and/or maximum fractionation. In addition, it may be advantageous to use one or more immiscible non-polar solvents in conjunction with the polar solvent or solvents in order to set up an opposed solubilizing action on the more fully esterified polyhydroxy substances when using polar materials possessing very high solvent action or when operating on mixtures of partial esters which have many solubilizing groups, such as olefine linkages or hydroxy radicals. It is also a feature of this invention to employ miscible non-polar solvents or miscible anti-solvents along with the polar solvents in order to improve or reduce, i. e., control, the solvent properties on the materials which are not desired to be extracted. For example, water-saturated solvents are in many cases more selective than the corresponding anhydrous materials. In other cases a highly effective but non-selective miscible solvent may be added to a very selective solvent to increase the yield.

In operating this process it is possible to employ temperatures and proportions which yield immiscible liquids at all times. This is the case in the preferred method of operating in a continuous counter-current manner. The procedure in this type of operation usually is to flow the mixture containing partial esters of polyhydric alcohols, with or without non-polar solvents, such as petroleum ether, into a vertical tower near the bottom or at any point substantially below the top thereof. Simultaneously, a polar solvent, such as furfural, is introduced into the tower near the top. If desired, the tower may be equipped with packing, baffles, plates, and/or heating units to vary or control the temperature throughout the extraction. The denser solvent flows downwardly through the column counter-current to the rising mixture of aliphatic polyhydroxy derivatives. An interface will be formed at one point in the tower between the lower downwardly flowing solvent phase through which the partial esters rise in the form of drops or the like, and the upper rising extracted partial ester phase through which falls the fresh solvent. This interface is usually midway between the two inlet ports but may be nearer to either of them depending on the characteristics of the material under treatment and the extractant. It is also desirable to have a separating zone below the lower and above the upper entrance ports for the materials to be counter-currently treated in order to permit complete separation of the immiscible phases. For effecting maximum concentration it is another feature of this invention to separate the solvent from the extract and to return a portion of the extracted material to the tower at a point near the bottom but below the entrance port of the original mixture undergoing extraction. By this process of reflux it is possible to even further concentrate and purify the less highly substituted polyhydroxy partial ester. With solvents, such as alcohol, having a lower density than the oil, the oil is introduced near the top and the solvent near the bottom.

The above outlined procedure can be also conducted in a counter-current, multi-stage manner including the reflux feature. In such operation the solvent is flowed into the last of a series of batch treating stages and the mixture to be purified is introduced into the first, or into an intermediate stage if reflux is to be employed. The raffinate from each stage moves progressively toward the last stage and the extract from each stage moves progressively toward the first stage. When employing reflux, the extract from the first stage is separated from its solvent and a substantial portion of the purified solvent-free extract of less fully esterified material is returned as the charge to the first stage. In each of these stages the reffinate from the previous stage and the extract from the following stage are intimately mixed for a substantial period. The mixture is then permitted to settle and the two layers are separately drawn off, one representing the raffinate charge to the following stage, and the other representing extract charge to the next previous stage. The reffinate from the last stage comprises the more fully esterified and more saturated polyhydroxy derivatives.

Another procedure involves concurrent extraction by flowing the material to be extracted in a mixture with the polar solvent through a zone wherein the conditions are such that the materials are miscible; for example, higher temperatures and/or higher proportions of solvents. The materials are held in this condition for a sufficient time to effect uniformity of solution; for example, by flowing through a pipe of relatively small cross-section and tortuous path. After complete mixing the mixture is treated so that incipient stratification (turbidity) takes place; for example, by cooling the mixture, by evaporation, or by addition of an immiscible, non-polar solvent (e. g., hydrocarbon) or a miscible non-solvent (e. g., water). The material in this turbid state is subjected to centrifugal action in order to effect separation of the suspended matter, i. e., the material causing turbidity. This process may involve the simultaneous stratification and separation during the centrifugal treatment. It is also possible to cool or precipitate by other means to an extent that immiscible layers are formed, but the preferred procedure involves the centrifugal action because of the more rapid separation effected.

Of course, simple batch extracting in a single or a plurality of stages, each employing fresh solvent, can be used, but this is not generally employed in commercial operation because of the higher cost and poorer yields involved.

The process, as stated hereinbefore, is directed to the liquid-liquid extraction of the partial ester mixtures. Such procedures may also include operations wherein a solid phase is formed in addition to the two liquid phases. In other words, a double purification is effected by separation of the three phases.

The processes involving solid-liquid extraction may be conducted in the following manners, among other methods.

A solid, plastic composition of partial esters may be admixed with a polar solvent at a temperature below that at which the composition becomes liquid. After the composition has been intimately mixed with the solvent, the insoluble extracted portion is separated by means of centrifuging, filtering and/or decanting. The liquid extract is treated to remove the solvent which may be returned for extracting additional composition under treatment. The material removed from the solvent is a fraction of polyhydroxy material of lower degree of substitution. The process may be repeated in one or more stages employing the same or different solvents or mixtures of solvents.

Other methods include the complete dissolution of the mixture in the polar solvent or solvents with or without miscible non-polar solvents and non-solvents at higher temperatures followed by the fractional precipitation or crystallization of the polyhydroxy material having a higher degree of substitution from the solution by lowering the temperature and/or by addition of a miscible non-solvent. The separated material may be removed by centrifuging, filtering and/or decanting. This is similar to a procedure outlined for liquid-liquid extraction but temperatures are employed at which the separated material is solid rather than liquid.

It is possible according to the invention to remove water and dissolved salts or alkali from the compositions containing the partial esters by means of polar solvents. The addition of a water-immiscible polar solvent or solvent combination will cause aqueous material to separate to a major extent from the resulting solution of partial esters of polyhydric alcohols. This separation may be effected under conditions that total miscibility of the solvent and ester composition results or under conditions that fractionation takes place. Non-polar solvents in conjunction with the polar solvents are also effective for this purpose. When employing polar solvents, miscible wholly or partially with water, it is possible to cause water separation by the addition of salts of inorganic acids or of low molecular weight organic acids such as sodium chloride, sodium sulphate, sodium phosphate, sodium carbonate, sodium borate, sodium acetate or the corresponding ammonium or other alkali metal salts. An immiscible aqueous salt solution or salt layer will separate out, and if any inorganic salts and other water-soluble impurities are present these will probably be removed too. Hence the process is not only one of fractionation, but also involves simultaneous purification and extraction from other materials.

The following examples are given for the purpose of illustrating the present invention as applied to the treatment of materials containing partial esters, but they are not intended to be limiting on the scope thereof.

*Example I*

1,000 grams of partially hydrogenated soybean oil, 500 grams of glycerol, and 10 grams of sodium hydroxide are thoroughly mixed, heated to the boiling point of glycerol and refluxed for about fifteen minutes (approximately at the boiling point of glycerol). After the reflux reaction period, the liquids are cooled and the excess glycerol is allowed to settle. The supernatant fatty layer, which consists essentially of monoglycerides, is then separated from the lower glycerol layer. The product of the reaction is found to be only slightly soluble in ether but quite soluble in alcohol.

The product is dissolved in 3 liters of alcohol at a temperature of about 60° C. A sufficient amount of dilute sulphuric acid is added to the alcohol solution to neutralize any sodium hydroxide or other alkaline products. Sodium sulphate is precipitated and filtered, or otherwise separated, from the solution.

The alcoholic solution is then slowly cooled to about 50° C. and maintained at this temperature for about 4 hours. At this temperature a small amount of oily material will separate out below the alcoholic solution. This insoluble portion which is essentially triglyceride material is separated. The alcoholic solution is again cooled to a slightly lower temperature of about 40° C. and maintained at this temperature for about 4 hours. Another portion of oily material comprising essentially diglycerides separates out and is removed. The solution is then permitted to cool to about 20° C. (room temperature) over night and an insoluble product consisting essentially of crystallized monoglycerides is filtered from the solution. The filtrate is then cooled to about 2½° C. and maintained at this temperature for about 4 hours. A further precipitate of monoglycerides is formed and removed by filtration. The alcoholic solution is then cooled to about $-35°$ C. and a still further precipitate of monoglycerides separates out and is removed therefrom.

The latter three precipitates are redissolved in 2½ liters of alcohol at a temperature of 60° C. and the solution decolorized with activated carbon. The solution is then cooled in stages as in the first series of fractional precipitations to obtain corresponding fractions of tri-, di- and monoglycerides of variable solubilities.

The combined precipitates of monoglycerides are then dissolved in 1,200 cc. of ethyl alcohol at a temperature of 60° C., the solution decolorized with activated carbon, and the fractional precipitation and/or crystallization repeated. The monoglyceride fractions are redissolved and fractionated from the alcohol solution in 4 additional stages employing, respectively, 1,200 cc., 1,500 cc., 1,400 cc., and 1,200 cc. The several fractions from the last fractionation were examined and found to be relatively pure materials of varying unsaturation, free of contaminating substances which cause odor-reversion, color and other undesirable properties. The monoglyceride fractions may be employed separately or in admixture for various purposes, particularly as a surface active agent in the preparation of food products, such as ice cream, margarine, shortening, peanut butter, and the like. The poly-unsaturated monoglycerides may be steam distilled to remove glycerine, thus yielding an unsaturated triglyceride which may be used as a drying oil. The mono-unsaturated glycerides may be similarly converted to an olive oil type product useful in food products or the like. The triglycerides may be employed for the usual purposes—for example, foods, lubricants or soap—or in the preparation of additional quantities of monoglycerides. The diglycerides may be used to prepare triglycerides by steam distillation or they may be used in the manufacture of additional monoglycerides.

The fractionation of the mono-esters of different degrees of unsaturation possesses many advantages over the fractionation of the triglycerides because the mono-esters contain only one fatty acid radical either saturated or unsaturated to a definite extent whereas the triglycerides include not only the fully saturated triglycerides, but also mixed saturated-unsaturated triglycerides, mixed unsaturated triglycerides, and triglycerides of the same unsaturated fatty acids. Obviously it is difficult, if not impossible, to separate the saturated acid derivatives from the various unsaturated acid derivatives in such triglyceride mixtures. The conversion of monoglycerides to triglycerides is much milder than the synthesis of triglycerides from fatty acid and glycerine, hence the resulting oils are not polymerized and are of a better color and odor.

*Example II*

Partially hydrogenated cottonseed oil of iodine number 70 and saponification number of 193 is heated with an excess of glycerol in the presence of a small amount of sodium hydroxide. The soap and excess glycerol are removed by treatment with phosphoric acid after deodorization at about 150° C. The saponification number of the product is 168.0. 30 grams of the product are dissolved in 150 cc. of hot chloroform and 1,000 cc. of hot 95% ethyl alcohol. The mixture is cooled slowly to 2° C. The precipitate which forms is filtered, washed with a little cold alcohol, and dried. The yield is about 5.5 grams of a material having a saponification number of 192, which is substantially the same as the original triglyceride material. The solvents are removed from the filtrate. About 24 grams of material having a saponification number of 166.5 are recovered. The theoretical saponification number of the monoglycerides is 159.2 and of the diglycerides is 183.3. It is seen that the precipitate from the alcohol-chloroform solution is nearly pure triglyceride, whereas the extract is substantially pure monoglycerides. Additional fractionation of the extract separates the monoglycerides and diglycerides into pure fractions of these materials of varying degrees of unsaturation.

*Example III*

150 grams of the partial esters similar to those employed in Example II, but with a saponification number of 166 and iodine number of 69.4, are dissolved in 200 cc. of petroleum ether (boiling point 40–70° C.) and extracted with 250 cc. of furfural at 30° C. in a simple batch extraction. The liquid layers are separated and the solvents removed from each layer by steam distillation in vacuo. The furfural soluble fraction or extract has a saponification number of 155.8 and an iodine number of 67.6. The hydrocarbon soluble fraction or raffinate has a saponification number of 173.6 and an iodine number of 71.6. Some esters of polymerized glycerol are present in the original material and are concentrated in the furfural due to their greater polarity than monoesters of glycerol, hence the low saponification number. Repeated fractionations of the raffinate separate the triglycerides and diglycerides, while further fractionation of the extract separates the polyglycerol esters from monoglycerol esters, which in turn are separated into fractions of varying degrees of unsaturation.

The source of the partial esters is immaterial and they may be prepared by any of the methods described in the numerous patents and literature articles. Because of the varied sources many different types of admixed agents and impurities are separated by the present process. Among the methods for preparing the materials which may be purified by the method of the present invention are those described in Christensen, U. S. Patent No. 2,022,494; Edeler, et al., U. S. Patents No. 2,206,167 and No. 2,206,168; Kapp U. S. Patent No. 2,207,251, Oelverwertung, Austrian Patent No. 67,061, and Jurgens, German Patent No. 277,641. This list is merely by way of illustration and the present process is not limited to the purification of the agents prepared by the above processes but may be applied to those prepared by any process. The method is effective not only for separating monoglycerides diglycerides and triglycerides, but also for fractionating mixtures containing one or more of the following materials: Mono-aliphatic acid esters of ethylene glycol, of diethylene glycol, of diethylene thioglycol, of triethylene glycol, of 1,4 butylene glycol, of 1,2 propylene glycol, of 1,2 pentandiol, of glycerol chlorhydrin, of glyceric acid, of N-diethanolacetamide, of 1,6 hexandiol, and of other glycols; mono- and di-organic monocarboxylic acid esters of glycerol, of beta methyl glycerol, of 1,2,5 pentantriol, and of other trihydric alcohols; mono-, di-, tri- and higher partial esters of erythritol, hexitols, hexoses, and related materials. The acids esterified with the polyhydric alcohol may be any of the organic monocarboxylic acids having at least six carbon atoms, such as caproic acid, n-heptoic acid, caprylic acid, n-nonoic acid, capric acid, n-undecenoic acid, lauric acid, tridecanoic acid, myristic acid, palmitic acid, palmitoleic acid, elaeostearic acid, margaric acid, stearic acid, elaidic acid, dichlorstearic acid, oleic acid, linoleic acid, linolenic acid, eicosanoic acid, behenic acid, ricinoleic acid, cerotic acid, melissic acid, acids from oxidized petroleum, naphthenic acid, abietic acid and/or other monocarboxylic acids, whether cyclic, branched or straight chain, saturated or unsaturated, substituted or unsubstituted, or mixtures thereof, such as are obtained from coconut oil, tallow, peanut oil, cottonseed oil, marine oils, palm oil, olive oil, whale oil, linseed oil, lard oil, castor oil, tung oil, oleo oil, spermaceti beeswax, corn oil, menhaden oil, perilla oil, oiticica oil, soybean oil, tall oil, and their halogenated and hydrogenated products. The partial ester may be a mixture of the same fatty acid esterified to different degrees with different polyhydric alcohols and/or different fatty acids with the same polyhydric alcohol. In most cases it will be a mixture of partial fatty acids of the same polyhydric alcohol, for example monoglycerides and higher glycerides of fatty acids prepared by reacting glycerine with coconut oil or other fatty oils or fats in the presence of an alkaline catalyst.

The extraction solvents which may be employed in the present invention are non-reactive polar solvents, preferably organic. These solvents usually contain one or more of the following groups: alcohol, phenol, carboxylic acid, acid nitrile, acid anhydride, acid amide, carboxylic ester, aldehyde, ketone, mercaptan, primary amine or primary amine bases, nitro, sulphate, carbonate, and phosphate groups, and also may contain one or more of the following groups which assist the above listed functional groups: namely, ether, thioether, olefine, secondary amine and tertiary amine and the corresponding bases. In the case of organic solvents the number of carbon atoms usually should not be greater than six, and the compound may have three carbon atoms for each of the groups listed in the first series, and one carbon atom for any other groups in the compound which are listed in the second series. It is essential that the properties of these materials and the temperatures employed should be such that two phases are formed and that the solvents are not reactive under the treatment conditions. Miscible polar solvents which do not meet the above requirement and also miscible non-polar solvents may be used in conjunction with the selective polar solvents to be employed in the present process in order to alter the solubility of certain of the constituents under treatment. Likewise it is possible to increase the selectivity of the process by employing non-miscible non-polar solvents which tend to hold the more fully esterified materials while the polar solvent extracts the less fully esterified more hydrophylic material.

The polar solvents which may be employed for the present purposes include methyl alcohol, ethyl alcohol, propyl alcohol, isopropyl alcohol, allyl alcohol, methylallyl alcohol, phenol, resorcinol, ethylene glycol, ethylene chlorhydrin, diethylene glycol, diethylene thioglycol, ethylene glycol monomethyl ether, ethylene glycol monoethyl ether, ethylene glycol monoacetate, ethylene glycol diacetate, ethylene glycol diformate, ethylene glycol monolactate, ethylene glycol monoglycolate, triethylene glycol, propylene glycol, butylene glycol, 1,4, pentandiol, pentantriol 1,2,5, propylene glycol chlorhydrin, glycerol, glycerol monoacetate, glycerol diacetate, glycerol triacetate, glycerol monobutyrate, glycerol dibutyrate, glycerol monocaproate, glycerol monopropionate, methyl glycolate, ethyl glycolate, ethyl acetoglycolate, methyl lactate, ethyl lactate, methyl malonate, ethyl oxylate, lactonitrile, propionitrile, methyl allylnitrile, formic acid, acetic acid, acetic anhydride, lactic acid, methyl formate, ethyl formate, methyl levulinate, ethyl N-methyl carbamate, ethylidine diacetate, ethyl acetoacetate, methyl acetoacetate, methyl maleate, methyl furoate, methyl chloracetate, methyl cyanoacetate, acetaldehyde, methoxyacetaldehyde, furfural, furfuryl alcohol, nitrobenzaldehyde, nitromethano, nitroethane, 2-nitroethyl propionate, acetone, diacetyl, diacetone alcohol, acetonyl acetone, formamide, acetamide, propionamide, butyramide, N-ethanolacetamide, aniline, ethyl diamine, diethyl triamine, triethylene tetramine, ethanolamine, diethanolamine, triethanolamine, monoglycerolamine, diglycerolamine, triglycerolamine, trishydroxymethyl aminomethane, hydroxyethyl ethylene diamine, trimethylphosphate, triethylphosphate, diethylsulphate acetylmethylcarbinol, acetochlorhydrin, dichlorotriethylene glycol, 2-hydroxymethyl, 1,3 dioxolone, methyl butanolone, acetone plus sulphur dioxide, liquid sulphur dioxide, liquid carbon dioxide, carbon bisulphide, and the like.

The temperature of operation as indicated hereinbefore will depend mainly on the method of treatment, the type of solvent, the proportion of solvent, and the material under treatment. In general, the solvents are more selective at lower temperatures but the quantity of material dissolved is usually lower, hence it is a question of balancing the degree of separation against the quantity of solvent necessary. When liquid-liquid extraction is the desired method, of course a low temperature limit is set by the temperature of solidification of one or both of the phases. A high temperature limit is similarly fixed in most cases by the fact that the polar solvents will either become completely miscible with the total ester mixture under treatment or will dissolve abnormally large quantities of all constituents in the ester mixture. The proportion of solvent to ester material under treatment will usually be within a range of about 1 part to 15 parts by volume of solvent to 1 part of oil. For simple single-stage extractions a proportion of about 3 to 5 parts of solvent to 1 part of ester material is satisfactory. In counter-current extraction it is of course possible to employ smaller quantities of solvent to effect an equivalent purification.

The ester material may be recovered from the solvent solution by crystallization, vacuum distillation, flash distillation, and precipitation by the addition of non-solvents such as water. For large scale production it is desirable to recover the solvents for return to the process in the treatment of fresh materials.

As indicated in Example I, the fractional crystallization or precipitation of the partial esters from the extract solution has the additional merit of removing substances which in many cases have a deleterious action in the extracted product. In some cases these materials will precipitate first from the solvent solution, but in general it has been found that they are among the last materials to be precipitated or crystallized from the extracting solvent. Hence by the processes of this invention it is possible not only to fractionate and purify the partial esters, but also to effect an improvement in color, taste and odor, and the stability of the product in resistance to reversion in these properties.

The fractionation and purification process may be performed in a single unit with a single solvent, but in many cases there are advantages in operating in several extracting steps of the same type or different types with the same or different solvent or solvents; for example, one solvent may be effective for concentrating the esters of aliphatic polyhydroxy substances of lower degree of substitution when these materials are present in small percentages, but the same solvent may be much less selective when the concentration of the constituent to be extracted is present in higher proportions. On the other hand, another solvent may have a directly opposite change of selectivity; that is, be more effective in concentrated mixtures than on dilute mixtures. Hence, when starting with a material having a low content of slightly esterified materials, the first stage of extraction would be with the former solvent, and the extract of the solvent from the first stage of extraction could then be extracted in a second stage with the latter solvent. In another case, the first stage of extraction may be one involving simple or concurrent mixing and settling to remove a small or large proportion of the constituents of the material under treatment followed by a counter-current extraction of the solvent-free extract and/or of the raffinate from this first stage of extraction. As another variation, it is possible to obtain an extract of a mixture containing esters of aliphatic polyhydroxy substances in a polar solvent and then to extract this solution by any method, preferably continuous counter-current extraction with an immiscible solvent, such as gasoline, petroleum ether or other non-polar solvents. Any combination of solvents or mixtures of solvents and/or of methods disclosed herein may be employed in the present process. By "non-reactive" solvents it is meant to include solvents which do not react with the hydroxy substituted derivatives under the conditions of treatment.

The fractions obtained by these extraction procedures, with or without the solvents present, may be treated with adsorbent agents, such as activated carbon, bauxite, kieselguhr, silica gel and clay, alkali or other purifying agents to yield final products of unusually high purity. Although the above description has been directed to the treatment of partial esters of polyhydroxy compounds, it is likewise applicable to the fractionation and purification of organic acid amides of amino-alcohols, such as mono ethanolamine, diethanolamine, trishydroxy methyl aminomethane, monoglycerolamine, diglycerolamine, and the like. That is, the process is applicable to the esters or amides having free hydroxy groups. The products of the present process may be used wherever the corresponding non-purified full and partial esters and/or amides have previously been employed. As pointed out in Example I, the agents having free hydroxy groups are exceptionally satisfactory for use as emulsifying agents for emulsifying or for other surface active purposes. The agents are unusually effective in food preparations, such as ice cream, shortening, peanut butter, and the like, because of their greater efficiency, their purity and their greater resistance to reversion. The full esters are likewise improved in color, odor, taste and stability and may be used in foods, lubricants, soap manufacture, manufacture of partial esters, and organic synthesis. The partial esters by themselves possess surface active properties, but for particular purposes these purified compounds may be reacted with inorganic polybasic acids to form the corresponding partial esters thereof, which when neutralized are highly desirable surface active agents possessing deterging, emulsifying, penetrating and wetting properties.

Another aspect of the invention involves the separation of esters of polyhydric alcohols by solvent crystallization. According to this method the product to be treated is dissolved in the solvent at an elevated temperature and the mixture cooled to precipitate or crystallize fractions of varying degree of saturation and melting point. The fractions crystallized may then be separated from the solvent by suitable means such as filtration. By reducing the temperature in carefully controlled intervals a plurality of fractions of similar chemical and physical properties may be produced. The crystallization method is particularly applicable to the treatment of full esters such as triglycerides but it may be applied to the separation of partial esters or mixtures of full and partial esters by properly selecting the solvent or mixtures of solvents. When products containing two or more compounds of the group of monoglycerides, diglycerides and triglycerides are treated, the order of crystallization from polar solvents is usually triglycerides, then diglycerides and then monoglycerides. Thus in the treatment of mixtures of triglycerides, diglycerides and monoglycerides with a solvent such as ethyl alcohol and chloroform as described in Example II, the mixture may be separated on reducing the temperature by crystallization in the reverse order of the number of free hydroxyl groups. In general, the same order applies also to other partial esters. When treating a product comprising essentially full esters as distinguished from partial esters, for example, triglycerides as distinguished from monoglycerides and diglycerides, the order of crystallization is usually according to the degree of saturation and melting point, i. e., the more saturated and higher melting point components crystallize first.

The crystallization method differs from the liquid-liquid phase operation in that the separation according to the degree of unsaturation is not so pronounced in the crystallization method. On the other hand the crystallization method gives sharper separation according to the melting point and completeness of saturation and length of carbon chain, whereas the liquid-liquid phase extraction tends to make a separation between the unsaturated and saturated fractions. It is not possible by such method to obtain a sharp separation between products of the same length of carbon chain.

In the solvent liquid-liquid extraction operation the separation is made on differences in degree of polarity of the compounds to be separated. Within the class of fatty materials the degree of polarity varies only over a rather narrow range and it is, therefore, difficult to make a sharp separation. On the other hand, in the solvent crystallization process the separation is made on the basis of the difference in melting point and solubility of the various fatty materials. The melting point varies over quite a wide range and it is therefore possible to make quite sharp separations if the proper conditions are chosen.

The melting point of the fatty material effects the degree of solubility to a greater extent than does the degree of unsaturation. It is, therefore, possible to make a more marked separation on the basis of melting point than on the basis of unsaturation.

To illustrate, attempts have been made to separate fatty materials on the basis of unsaturation by means of solvent crystallization. However the degree of solubility between the saturated and unsaturated constituents is not sufficiently different to make sharp separations and only a limited number of cuts can be made. On the other hand when the separation is made on the basis of melting point where large differences exist in the degree of solubility, a large number of cuts can be made each possessing widely different melting points.

In the solvent crystallization process the degree of separation on the basis of melting point can be controlled to some extent by the method in which the process is carried out. If the crystallization is carried out rapidly, causing a quick crystallization of the higher melting point constituents, some of the lower melting constituents are likely to be adsorbed or occluded on the crystals thereby causing a lesser degree of final separation. However, if the crystallization is carried out slowly and if the solvent ratio and temperature are adjusted, the adsorption and occlusion is held at a minimum. Further, if the crystals are well formed and granular they can be washed with cold solvent washing away from them the lower melting point constituents which are adsorbed, resulting in a separation which is considerably sharper.

In the solvent extraction process such control is not possible. Further the crystallization process when applied in a manner to obtain separation on the basis of melting point as contrasted to that intended to cause separation on the basis of unsaturation is more easily controlled in that the crystals are more readily formed and less occlusion takes place resulting in a sharper separation.

The solvents disclosed above include some which are particularly suitable for liquid-liquid phase treatment and others which are more applicable to solvent crystallization methods. The solvents which we prefer to employ in fractionation by crystallization may be roughly classified as follows: lower aliphatic alcohols, aromatic alcohols, esters of the lower aliphatic alcohols and aliphatic monocarboxylic acids, ethers of the lower aliphatic alcohols, aldehydes, organic acids, ketones and amines derived from the lower aliphatic alcohols, and phosphoric acid esters of lower aliphatic alcohols. The chain length of the acids or alcohols can usually vary from 1 to about 8 carbon atoms. The best results are obtained in the range of 3 to 5 carbon atoms. In addition partially halogenated derivatives of the above classes of compounds can be used.

Examples of the alcohols are methyl alcohol, ethyl alcohol, propyl alcohol, isopropyl alcohol, butyl alcohol, isobutyl alcohol, secondary butyl alcohol, tertiary butyl alcohol, amyl alcohol, isoamyl alcohol, allyl alcohol, methylallyl alcohol, cyclohexanol and methylcyclohexanol.

Examples of esters are methyl formate, ethyl formate, propyl formate, isopropyl formate, butyl formate, methyl acetate, ethyl acetate, propyl acetate, isopropyl acetate, butyl acetate, amyl acetate, methyl propionate, ethyl propionate, propyl propionate, butyl propionate, amyl propionate, methyl butyrate, ethyl butyrate, propyl butyrate, butyl butyrate, amyl butryrate, ethylene glycol diacetate, ethylene glycol diformate, glycerol diacetate, glycerol triacetate, glycerol dibutyrate, methyl furoate, methyl chloracetate, ethylidine diacetate, and acetyl methyl carbinol.

Examples of organic acids and organic acid anhydrides are formic acid, acetic acid, propionic acid, acetic anhydride, butyric acid and caproic acid.

Examples of the aldehydes are formaldehyde, acetaldehyde, propionic aldehyde, butyl aldehyde and capryl aldehyde.

Examples of the ketones are acetone, methyl ethyl ketone, methyl butyl ketone, diethyl ketone, ethyl propyl ketone, dipropyl ketone, propylbutyl ketone, dibutyl ketone, diacetyl, diacetone alcohol, acetonyl acetone.

Examples of amines are aniline, ethylene diamine, diethylene diamine, pyridine, propyl amine, quinoline, butyl amine, amyl amine, and hexyl amine.

Examples of organic phosphates are ethyl phosphate, diethyl phosphate, propyl phosphate, dipropyl phosphate, butyl phosphate, dibutyl phosphate, ethyl-butyl phosphate, ethyl propyl phosphate, propyl butyl phosphate, triethylphosphate, tripropylphosphate and tributylphosphate.

Examples of chlorinated products are methylchloroformate, methylchloroacetate, dichloro triethylene glycol, beta-beta' dichloro ethyl ether and ethylene dichloride.

Examples of ethers are methyl ether, ethyl ether, propyl ether, isopropyl ether, butyl ether and amyl ether.

It may be desirable in some cases to use mixtures of two or more of the above solvents.

Instead of chilling the mixture of solvent and ester of polyhydric alcohol in order to cause crystallization, an antisolvent may be added. The antisolvent is a material in which fats are insoluble or only slightly soluble. They may be polar, low molecular weight compounds. The most common are water and the lower aliphatic alcohols such as methyl and ethyl alcohol. The temperature at which they are used will vary depending upon the fat solvent which is used, and the type of fatty material which is in solution. At times it is advantageous to use a combination of cooling and the antisolvent. It is generally necessary to add the antisolvent rather slowly and with quite rapid agitation in order to produce a precipitate which is crystalline and easily filterable.

In practicing the invention the fat and crystallization solvent may be fed in properly proportioned amounts to a chiller wherein the mixture is chilled to cause separation of crystallized fractions. The chilled mixture may be mixed with additional cold solvent and the product subjected to filtration in a rotary continuous type of filter in which the solid material is removed as a filter cake on a segmented rotating drum. The filter cake may be washed by a portion of the cold solvent and the used wash solvent may be reused in the system, for example, by mixing it with the charge to the filter. The solvent may be stripped from the filter cake and the filtrate in suitable strippers.

The lower molecular weight alcohols, methyl, ethyl and isopropyl alcohol, are not generally suited for use as solvents in the crystallization of triglyceride fatty materials or for completely esterified esters of other polyhydric compounds without the use of auxiliary solvents. If the fatty compounds contain unesterified hydroxyl groups such as in the case of mono- and diglycerides, then the lower alcohols find utility. The polar nature of the molecule of the fatty material is increased if it contains free hydroxyl groups and the lower alcohols being polar in nature naturally dissolve the partial esters quite readily. The completely esterified esters of glycerol and other polyhydric alcohols such as triglycerides being non-polar in nature are not soluble to an extent in the lower alcohols alone to render them practical as solvents for crystallization. As the chain length increases in the alcohol, the solubility of the completely esterified esters increases and their application as solvents for crystallization increases. Normal propyl alcohol can be used with a fat of intermediate hardness such as lard, cottonseed oil, tallow, grease and partially hydrogenated oils, etc.

Generally, the softer the fatty material used, the smaller the amount of the solvent required to cause complete solution at elevated temperatures. As the melting point of the original fatty material increases, more solvent is necessary in order to obtain complete solution. Generally, for the common fatty materials, such as inedible greases and soybean oil from one-half to five volumes and preferably one to three volumes of solvent to one volume of oil suffices. However, with the more saturated higher melting point fatty materials such as tallow and substantially completely hydrogenated fats or oils considerably more solvent may be necessary, for example up to ten volumes of solvent to one of fat.

The temperature of solution also depends on the solvent used and the melting point of the fatty material. For example, normal propyl alcohol dissolves an equal volume of lard at 100° F. Normal butyl alcohol dissolves an equal volume of lard at 80° F., while normal amyl alcohol dissolves lard at room temperature. As the chain length of the alcohol increases, solution is obtained at a lower temperature. Generally, temperatures from room temperature (about 70° F.) to 100° F. are satisfactory. However, temperatures up to the boiling point of the alcohol may be necessary in order to obtain complete solution with the higher melting fats such as tallow and hardened fats or oils. The fatty materials crystallize from the alcohol at temperatures varying with the alcohol used and the type of fatty material dissolved. The higher the melting point of the fatty material used, the higher will be the temperature at which crystallization begins. Over-all temperatures within the range of 100° F. down to 0° F. will generally be satisfactory.

It was pointed out above that ethyl, methyl and isopropyl alcohols are not suitable for the crystallization of triglyceride fatty materials. However, if an auxiliary solvent is used with them a sufficient solubility of the triglyceride material is obtained so that crystallization can be carried out.

In the case of triglyceride fats when the lower molecular weight alcohols are used the auxiliary solvent will be non-polar in nature. For example, a mixture of ethyl alcohol and diethyl ether can be used for crystallizing such as destearinating triglyceride materials such as cottonseed oil or tallow.

With the triglyceride fatty materials an alcohol of lower chain length may be used if an auxiliary solvent is employed. For example, normal propyl alcohol can be used for the destearination of lard while ethyl alcohol is not particularly suitable. However, if a mixture of ethyl alcohol and isopropyl ether is used sufficient solubility is obtained so that the destearination process can be practical.

In the separation of mono-, di- and triglycerides using the lower alcohols as a crystallization solvent sometimes it is advantageous to use an auxiliary solvent. A smaller amount of alcohol can be used and crystallization can be carried out at a lower temperature. Also it is possible to obtain a better type of crystals. Even at times it is possible to obtain separation of crystals instead of oils.

However, in the case of partial esters of polyhydric alcohols the lower alcohols such as methyl and ethyl alone can be employed, but the ratio of solvent and the rate of cooling must be carefully adjusted in order to avoid separation of oils and in order to obtain a sharp degree of separation.

When using an auxiliary solvent in the separation of mono-, di- and triglycerides the temperature at which the triglycerides separate is below their melting point and, therefore, they crystallize in well formed crystals. However, if the auxiliary solvent is not employed separation of the triglyceride material is at a temperature which is generally above the melting point of the triglyceride material and it therefore remains as an oil.

Separation of oils generally gives a less sharp degree of separation than when crystals separate. Nevertheless, the separation of the triglyceride material as an oil when the auxiliary solvent is not employed is quite pure, and if the proper means are available for separating the oil from the solution fairly good separation is obtained.

The separation of crystals is much easier to accomplish on a practical scale than is the separation of oily materials. The crystals can be washed with pure solvent resulting in a sharper degree of separation.

If the ratio of solvent to the mixture of mono-, di- and triglycerides is controlled so that the triglycerides separate at a temperature below their melting point, then crystallization will be obtained. The latter will require considerably more solvent than in the case where the oily material separates, and it is necessary to carry out the chilling at a slower rate.

Example IV

An equal weight mixture of mono- and trilaurin were dissolved in four volumes of ethyl alcohol at about the boiling point of the alcohol. The solution was cooled slowly to room temperature and the precipitate separated was filtered and washed with a small quantity of ethyl alcohol at room temperature. The melting point of the precipitate was 58° C., the melting point of the filtrate was 52° C., and the melting point of the original mixture was about 48°. About 25 per cent of the original material appeared in the precipitate and consisted essentially of trilaurin. The filtrate was chilled slowly to about 2° C. and the crystals which separated were filtered and washed with cold ethyl alcohol. Their melting point was about 58° and the sum of the two precipitates (trilaurin) made up about 50 per cent of the original mixture.

Example V

Lard was dissolved in an equal volume of normal propyl alcohol at 100° F. and the solution cooled to room temperature and filtered by gravity in an ordinary filter. Solvent was removed from the precipitate and filtrate by heating in vacuum. The melting point of the original lard was about 111° F. The melting point of the precipitate consisting essentially of tripalmitin and tristearin was 126° F., and the melting point of the filtrate was 81° F. About 30 per cent of the original lard appeared in the precipitate.

Example VI

Prime steam lard was dissolved in an equal volume of normal capryl alcohol at 100° F. The solution was cooled to about 40° F. and filtered by gravity and washed on the filter with a small quantity of chilled capryl alcohol. The precipitate amounting to 10 per cent of the original lard and containing tristearin had a melting point of 125° F., and the filtrate had a melting point of 45° F. The melting point of the original lard was about 110° F.

All fatty materials are quite readily soluble in the ketones. The solubility of the fatty material increases with the chain length of the ketones, but those containing from 3 to 6 carbon atoms are best adapted for crystallization. The fatty materials generally crystallize in granular crystals from this class of solvents. The amount of solvent required varies depending upon the molecular weight and melting point of the fatty material. Generally, one-half to five volumes of solvent for one volume of fatty material is required. However, there may be cases where up to ten volumes of the ketone may be necessary. The temperature required for solution is generally quite low, approximating the range from room temperature to 100° F. However, in the case of the lower molecular weight ketones and the higher melting point fatty material, considerably higher temperatures up to the boiling point of the ketone may be required in order to obtain complete solution. Ketones can be used to dissolve both completely esterified and partial esters of polyhydric alcohols and are suitable for crystallization of either types of fatty materials.

Example VII

A sample of white grease was dissolved in an equal volume of acetone at room temperature and chilled under agitation to about 40° F. The mixture was then filtered through a vacuum filter using a canvas covering as the filtering surface. After filtration was completed the precipitate containing essentially the glycerides of stearic and palmitic acids was washed on the filter with a small quantity of acetone at about 40° F. The solvent was removed from both the filtrate and the precipitate by vacuum distillation. The fraction which precipitated consisted of about 20 per cent of the original weight of the grease and had a melting point of about 50° C. and an iodine number of about 20. The filtrate had a melting point of about 30° C. and an iodine number of about 75.

Example VIII

Refined and bleached cottonseed oil were dissolved in an equal volume of methyl ethyl ketone at 100° F. and chilled under agitation to about 40° F. The mixture was filtered by means of a vacuum and the precipitate washed with a small quantity of chilled solvent. The solvent was removed from both the filtrate and precipitate by vacuum distillation. The precipitate containing the glycerides of the more saturated fatty acids consisted of about 20 per cent of the original oil and had an iodine number of 102 and a melting point of 75° F., and the filtrate had an iodine number of 112 and a cold test of about 30 hours and a melting point of 30° F. It will be observed that the separation was made on the basis of melting point in preference to separation on the basis of unsaturation.

Example IX

Refined and bleached cottonseed oil were dissolved in an equal volume of methyl butyl ketone at room temperature and the solution chilled to about 27° F. over a period of two hours. Then 500 cc. of methyl butyl ketone were added and the mixture filtered through a vacuum filter using a canvas covering as the filtering surface. The precipitate containing the higher melting glycerides of cottonseed oil was washed on the filter with a small quantity of methyl butyl ketone at about 30° F. The solvent was removed from the precipitate and filtrate. The oil in the filtrate consisted of about 72% of the original oil and had an iodine number of 111, a pour point of 10° F. and a cold test of 19 hours. The stearin or precipitate fraction had a titer of 42.2 and an iodine number of 89. The latter consisted of about 28% of the original oil.

Fats including partially or completely esterified materials are soluble in all proportions in esters even those of lower molecular weight. However, the solubility of the fat in this class of solvents increases as the chain length of the esters increases. The solubility of the fatty materials in these esters decrease somewhat as the melting point of the fatty material increases, and the degree of saturation increases. With most of the common fatty materials, one-half to five volumes of solvent is sufficient to dissolve the fatty material but with the higher melting point fatty materials, considerably more solvent may be required, particularly if lower molecular weight esters are used as the solvent. Generally, temperatures from room temperature to 100° F. are all that is required to obtain complete solution. However, it may be necessary in the case of the higher melting fatty materials to use a higher temperature, for example, up to 200° F. or over. Fats and fatty materials crystallize from the esters at temperatures varying with the type of fatty material and the ester used, as well as the quantity of ester. Generally, temperatures of the range from 100° F. down to 0° F. will cause precipitation of at least the higher melting point fraction of the fatty material. However, in order to precipitate completely, the low molecular weight, low melting point fatty materials, it may be necessary to use temperatures considerably under 0° F.

*Example X*

Refined and bleached cottonseed oil was mixed with about an equal volume of methyl formate, passed through a tubular chiller, and chilled to a temperature of about 30° F. About one-half part by volume of methyl formate was added to the chilled mixture and the whole mass passed through a continuous rotary vacuum filter which was equipped for washing the precipitate which gathered on the rotary drum. The precipitate consisting essentially of cottonseed stearin was washed with a small portion of methyl formate at 30° F. The precipitate was scraped from the drum and the solvent removed by distillation. The precipitate consisted of about 30 per cent by weight of the original oil and had an iodine number of about 106, and a melting point of about 90° F. The filtrate was passed through a solvent recovery system and after the solvent had been removed it had an iodine number of about 115 and a cold test of about 10 hours (which means that a sample placed in a four ounce glass bottle and put in an ice bath will show no cloudiness until after 10 hours).

*Example XI*

Choice white grease was dissolved in an equal volume of ethyl formate and the solution chilled to 45° F. over a period of about 75 minutes. Chilled ethyl formate was added and the mixture filtered by means of a vacuum filter using a canvas covering as the filtering surfaces. The precipitate of stearin was washed with a small quantity of chilled solvent and the solvent was removed from both the filtrate and precipitate by vacuum distillation. The filtrate had a pour point of about 35° F., and an iodine number of about 72. The precipitate amounted to about 20 per cent and had an iodine number of about 46 and a titer of about 113° F.

*Example XII*

Neatsfoot oil was dissolved in an equal volume of methyl chloroacetate at room temperature and the solution chilled to 30° F. The precipitate containing the glycerides of the higher melting point acids was filtered by ordinary gravity filtration and washed with a small quantity of the solvent. The solvent was removed from the filtrate and the precipitate by heating in a vacuum. About 20 per cent of the original oil was present in the precipitate which had a titer of about 95° F. and a pour point of about 40° F. The filtrate consisting of the remaining 80 per cent of the oil had a pour point of 15° F.

Ethers readily dissolve completely esterified esters of polyhydric alcohols because of the nonpolar nature of the two types of compounds. However, ethers do not readily dissolve partial esters of polyhydric alcohols because the latter are polar. The degree of solubility depends on the amount of polarity. For example, trilaurin is easily soluble in ethyl ether; monolaurin is quite insoluble; and dilaurin of intermediate solubility. For the common triglyceride fatty materials only relatively small volumes of ethers are required; one-half to five volumes usually sufficing. However, if the fatty material is of high melting point more ether is required, for example up to ten volumes or more. The temperatures required for solution of the common fats are quite low, ranging from room temperature to 100° F. However, if the fatty material is of high melting point, temperatures up to the boiling point of the ether may be required. The fats crystallize from the ethers at quite low temperatures—from room temperature down to −40° F.

When ethers are used on partial esters of polyhydric alcohols, an auxiliary solvent which is polar in nature is required. For example a mixture of mono-, di-, and triglyceride of partially hydrogenated cottonseed oil may be dissolved in a mixture of propyl ether and propyl alcohol and crystallization of the tri-, and diglycerides obtained when the solution is chilled.

*Example XIII*

An 80—20 mixture of triolein and trilaurin was dissolved in three volumes of ethyl ether at about the boiling point and the solution cooled to 40° F. The crystalline precipitate which separated was filtered and washed with cold ether and the solvent was removed from the filtrate and precipitate by heating in a vacuum. The precipitate, which consisted of trilaurin and amounted to 15 per cent of the total, had a melting point of 113° F. The filtrate had a melting point of 40° F.

*Example XIV*

Prime steam lard was dissolved in an equal volume of isopropyl ether at 110° F. and the mixture slowly cooled to 40° F. The fluffy precipitate which separated was filtered and washed with cold isopropyl ether. The solvent was removed from the filtrate and precipitate and their melting points determined. The precipitate which consisted essentially of the glycerides of palmitic and stearic acids had a melting point of about 118° F. The filtrate melted at about 43° F.

*Example XV*

Partially hydrogenated soybean oil of iodine number of 110 was dissolved in an equal volume of beta-beta- dichlorethyl ether at 150° F. and the solution chilled to 40° F. under agitation. The precipitate was filtered by means of a vacuum using a canvas as the filter medium. The precipitate was washed with cold solvent and the solvent removed from both the filtrate and precipitate by heating in vacuo. The precipitate which contained glycerides of the higher melting fatty acids and amounted to about 30 per cent of the original oil had an iodine value of about 118 and the filtrate an iodine value of about 106.

Fatty materials crystallize from the lower alkyl esters of phosphoric acid in well formed easily filterable crystals. Both the partial and fully esterified esters of polyhydric alcohols are soluble in the organic phosphates. With the ordinary fats such as cottonseed oil, greases, and lard, one-half to five volumes of solvent per volume of fatty material is sufficient. If the fatty material is of high melting point more solvent may be required up to ten volumes or more. Temperatures from room temperature (70° F.) to 200° F. are sufficient to obtain complete solution. Crystallization takes place at room temperature to 0° F. depending on the amount of ester and the melting point of the fatty material.

*Example XVI*

Glycerinated hydrogenated cottonseed oil of iodine number of about 80 was dissolved in two volumes of ethyl phosphate and the mixture was cooled to 35° F. The solid material which separated was filtered and washed with cold ethyl phosphate. The solvent was removed by vacuum distillation and iodine values determined on the filtrate and precipitate. The precipitate had an iodine value of about 84 and the filtrate an iodine value of about 77. The precipitate consisted essentially of completely esterified glycerol esters and made up about 20 per cent of the original charge.

*Example XVII*

An equal volume mixture of white grease and propyl phosphate was made at 100° F. and the solution cooled to 40° F. The solid material which separated was filtered by means of a vacuum and washed with cold solvent. The precipitate had a titer of about 109° F. and the filtrate a melting point of 40° F. The precipitate contained about 22 per cent of the original grease and consisted essentially of the glycerides of the higher melting fatty acids of the grease.

*Example XVIII*

Refined soybean oil of iodine value of 130 was dissolved in one volume of butyl phosphate and the solution cooled to about 35° F. The precipitate after filtration and removal of solvent had an iodine value of about 120 and the filtrate an iodine value of about 135 after removal of the solvent. The precipitate contained about 40 per cent of the original oil and consisted of the higher melting glycerides.

The ester material may be recovered from the solvent solution by crystallization, vacuum distillation, flash distillation, or precipitation by the addition of non-solvents such as water. For large scale production it is desirable to recover the solvents for return to the process in the treatment of fresh materials.

The fractional crystallization or precipitation of the esters from the solution may be used to remove substances which in many cases have a deleterious action in the product. In some cases these materials may be precipitated first from the solvent solution or they may be among the last materials to be precipitated or crystallized from the heating solvent. Hence, by the processes of this invention it is possible not only to fractionate and purify the esters, but also to effect an improvement in color, taste and odor, and the stability of the product in resistance to reversion in these properties.

The color, flavor, stability and reversion causing materials in fats is due to the presence of compounds of quite different chemical nature from the fats themselves. Their solubilities are also different and by the use of the proper solvent and temperature it is possible to separate them from the fatty materials. For example, the compounds in soybean oil which cause reversion may be separated from the oil by converting the hydrogenated oil to monoglycerides and crystallizing the monoglycerides from ethyl alcohol. The monoglycerides are precipitated and the reversion causing materials remain in solution. The color of animal fatty materials, such as tallows and greases, is due to the presence of pigments and decomposition products of the fats and their animal tissues. These foreign materials and decomposition products may be separated from the fatty materials by crystallization of the fats from suitable solvents. The foreign material and decomposition products have different solubilities than the fats and, therefore, may be separated under proper conditions.

In the cases where the color forming bodies are less soluble than the fats, they precipitate at a higher temperature than the fats. However, in most cases the color forming bodies are more soluble than the fats and remain in solution after the fats have been precipitated. An example of the latter is the separation of the colors of soybean oil by crystallization from acetone. If soybean oil is dissolved in acetone and repeatedly crystallized, a water-white oil is finally obtained and the color remains in the solvent.

The fractions obtained by crystallization with or without the solvents present may be treated with adsorbent agents such as activated carbon, bauxite, kieselguhr, silica gel and clay, alkali or other purifying agents to yield final products of unusually high purity.

Obviously, many modifications and variations of the invention hereinbefore set forth may be made without distinguishing from the spirit and scope thereof and, therefore, only such limitations should be imposed as are indicated in the appended claims.

This application is a continuation-in-part of applicants' co-pending application Serial No. 378,063, filed February 8, 1941, now abandoned, which in turn is a continuation-in-part of Serial No. 267,906 now Patent No. 2,308,848 filed April 14, 1939. This application is also a continuation-in-part of application Serial No. 448,002, filed June 22, 1942 now abandoned.

We claim:

1. A process for the manufacture of monoglyceride esters of fatty acids, which comprises treating hydrogenated vegetable triglyceride fat with an excess of glycerine under conditions to convert the triglyceride fat into a mixture containing a substantial amount of monoglycerides, contacting said mixture with chloroform and ethyl alcohol at a temperature of about 3° C. whereby unconverted triglyceride fat is precipitated from the solution, cooling the solution to the point of crystallization of the monoglycerides and separating the monoglycerides.

2. A process for the manufacture of partial glyceride esters of fatty acids, which comprises treating vegetable triglyceride fat with glycerine in sufficient amount and under conditions to convert a substantial amount of the triglyceride fat to monoglycerides and diglycerides, subjecting the resulting mixture to solvent extraction with a polar solvent and an auxiliary non-polar solvent at a temperature correlated with the amount of solvents whereby the predominating action of the solvents is to separate the glycerides on the basis of the relative number of hydroxyl groups and the mixture is separated into an extract phase and a raffinate phase, said extract phase being relatively rich in monoglycerides and the raffinate phase being relatively rich in diglycerides and triglycerides, and recovering monoglycerides from the extract phase.

3. A process for the manufacture of monoglyceride esters of fatty acids, which comprises treating hydrogenated vegetable triglyceride fat with excess glycerine under conditions to convert the triglyceride fat into a mixture containing a substantial amount of monoglycerides, dissolving said mixture in petroleum ether, extracting the resulting solution with furfural at a temperature of about 30° C. in an amount correlated with the temperature whereby a layer of petroleum ether rich in triglycerides and a layer of furfural rich in monoglycerides are formed, separating the layers and recovering the monoglycerides from the furfural layer.

4. The method of purifying monoglycerides formed by superglycerinating refined fats to separate therfrom materials tending to cause reversion of flavor and odor which comprises treating the monoglycerides with ethyl alcohol at a temperature such that a single phase is formed, reducing the temperature sufficiently to cause the product to separate into two phases, one of said phases containing monoglycerides and the other of said phases containing the reversion causing materials, and recovering the monoglycerides from the first mentioned phase.

5. The method of purifying monoglycerides formed by superglycerinating refined fatty acid triglycerides to separate therefrom impurities tending to cause reversion of flavor and odor which comprises treating the monoglycerides with ethyl alcohol at a temperature sufficiently high to cause the monoglycerides and said impurities to dissolve in the alcohol, cooling the solution to precipitate the monoglycerides and separating said precipitate from the solution of impurities.

6. The method of purifying monoglycerides formed by superglycerinating refined vegetable fats to remove materials tending to cause flavor and odor reversion which comprises treating the unpurified monoglycerides with ethyl alcohol under conditions such that the monoglycerides and flavor and odor reversion causing materials are dissolved in the alcohol, cooling the resulting solution to crystallize monoglycerides relatively free from said reversion causing materials and separating the crystallized monoglycerides from the solution.

7. The method of purifying monoglycerides formed by superglycerinating refined hydrogenated vegetable oils to remove impurities tending to cause flavor and odor reversion, which comprises forming a solution of said monoglycerides and flavor and odor causing materials in ethyl alcohol and crystallizing said monoglycerides from the alcohol solution whereby monoglycerides relatively free from flavor and reversion causing materials are obtained.

8. The method of purifying partial glycerides formed by superglycerinating refined fats to separate therefrom materials tending to cause reversion of flavor and odor, which comprises treating a superglycerinated refined fat containing substantial amounts of the partial glycerides with a polar solvent at a temperature sufficiently high to cause the partial glycerides and reversion-causing material to dissolve in the polar solvent, cooling the solution to precipitate the partial glycerides and separating said precipitate from the solution of reversion-causing materials.

9. The method of purifying monoglycerides formed by superglycerinating refined fats to separate therefrom materials tending to cause reversion of flavor and odor, which comprises treating a superglycerinated refined fat containing substantial amounts of the monoglycerides with a polar solvent at a temperature sufficiently high to cause the monoglycerides and reversion-causing material to dissolve in the polar solvent, cooling the solution to precipitate the monoglycerides and separating said precipitate from the solution of reversion-causing materials.

10. A process for the manufacture of partial glyceride esters of a fatty acid which are free of flavor and odor, comprising subjecting a refined glyceride fat which has been hydrogenated and treated with glycerine to convert said fat into a mixture containing a substantial proportion of partial glycerides to solvent treatment with a polar solvent at a temperature such that a single phase is formed, reducing the temperature so that two distinct phases are formed, one of said phases comprising a solution of a polar solvent and the material tending to cause reversion of flavor and odor and the other phase comprising the partial glycerides, and recovering the partial glycerides free of reversion-causing material.

11. A process for the manufacture of partial glyceride esters of a fatty acid which are free of flavor and odor, comprising subjecting a refined glyceride fat which has been hydrogenated and treated with glycerine to convert said fat into a mixture containing a substantial proportion of partial glycerides to solvent treatment with ethyl alcohol at a temperature such that a single phase is formed, reducing the temperature so that two distinct phases are formed, one of said phases comprising a solution of an ethyl alcohol and the material tending to cause reversion of flavor and odor and the other phase comprising the partial glycerides, and recovering the partial glycerides free of reversion-causing material.

12. A process for the manufacture of monoglyceride esters of a fatty acid which are free of flavor and odor, comprising subjecting a refined glyceride fat which has been hydrogenated and treated with glycerine to convert said fat into a mixture containing a substantial proportion of monoglycerides to solvent treatment with ethyl alcohol as the solvent at a temperature such that a single phase is formed, reducing the temperature so that two distinct phases are formed, one of said phases comprising a solution of an ethyl alcohol and the material tending to cause reversion of flavor and odor and the other phase comprising the monoglycerides free of reversion-causing material, and recovering the monoglycerides free of reversion-causing material.

13. A process substantially as described in claim 12 wherein the solvent treatment employs methyl alcohol as the solvent.

14. A process substantially as described in claim 12 wherein the solvent treatment employs propyl alcohol as the solvent.

15. A process substantially as described in claim 12 wherein the solvent treatment employs butyl alcohol as the solvent.

16. A process substantially as described in claim 12 wherein the solvent treatment employs amyl alcohol as the solvent.

HARLAND H. YOUNG.
HOWARD C. BLACK.

REFERENCES CITED

The following references are of record in the file of this patent:

UNITED STATES PATENTS

| Number | Name | Date |
|---|---|---|
| 1,505,560 | Grun | Aug. 19, 1924 |
| 1,974,542 | Parkhurst | Sept. 25, 1934 |
| 2,012,106 | Mauersberger | Aug. 20, 1935 |
| 2,228,040 | Voogt | Jan. 7, 1941 |

OTHER REFERENCES

Dean, Vitalization of fats, pp. 118–119, A. Harvey London, January 1938.

Lewkowitsch, Chem. Technology & Analysis of Oils, Fats & Waxes (1938) vol. I, page 671.

Brown, Chemical Reviews, vol. 29 (1941) page 349.